Nov. 24, 1942.  A. H. TINNERMAN  2,303,147
HINGED CONNECTION FOR RECEPTACLES AND THE LIKE
Filed Oct. 28, 1940   2 Sheets-Sheet 1
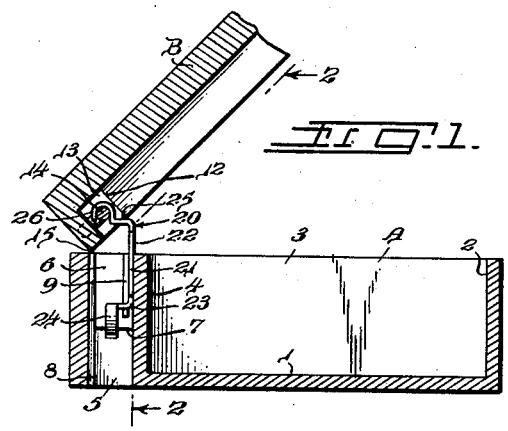
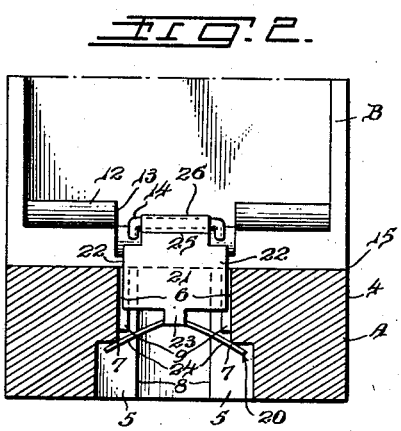
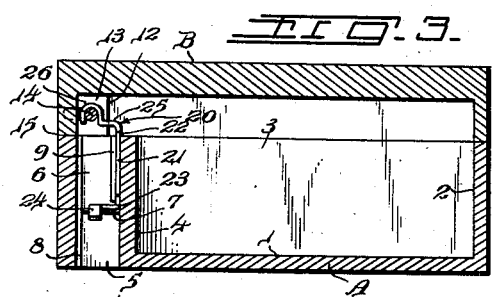
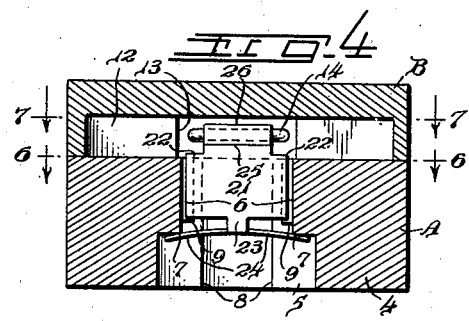
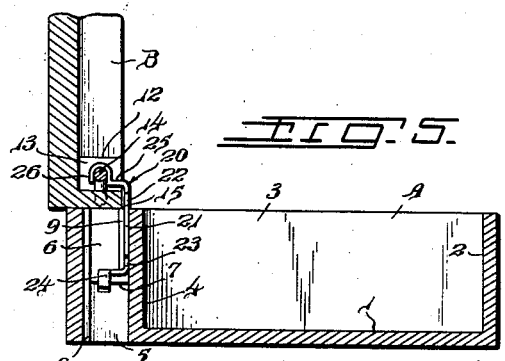
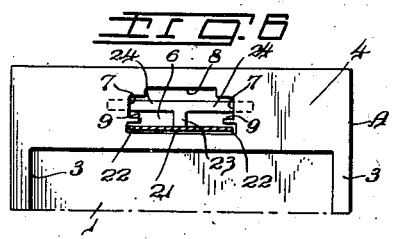
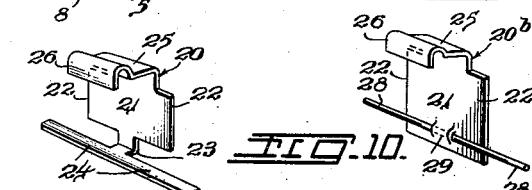
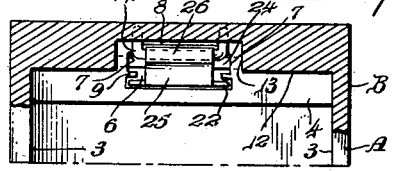
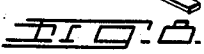
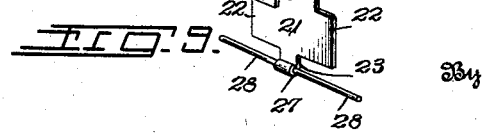
Inventor
ALBERT H. TINNERMAN
By H. G. Lombard
Attorney

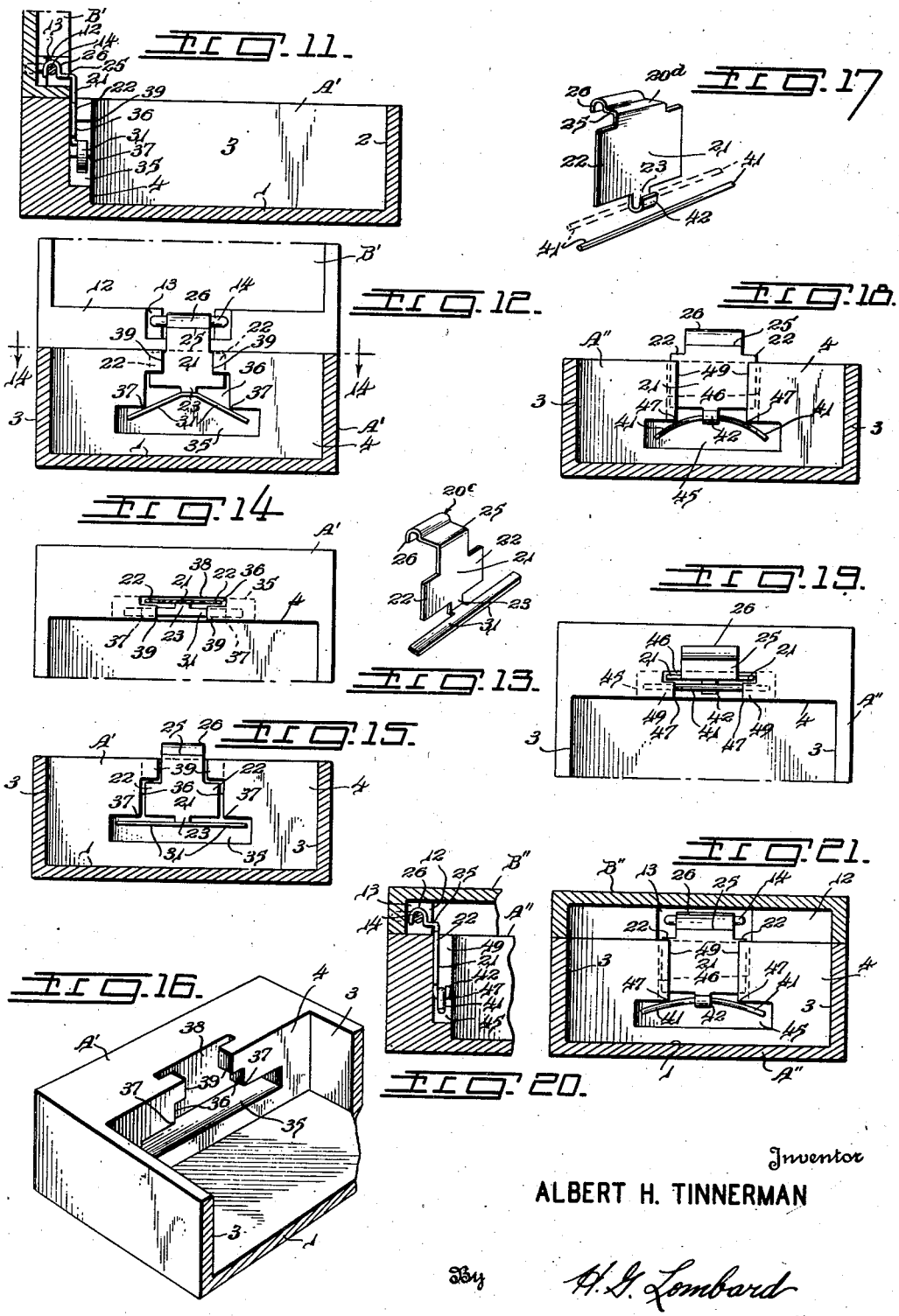

Patented Nov. 24, 1942

2,303,147

UNITED STATES PATENT OFFICE 2,303,147

HINGED CONNECTION FOR RECEPTACLES AND THE LIKE

Albert H. Tinnerman, Cleveland, Ohio, assignor to Tinnerman Products, Inc., Cleveland, Ohio, a corporation of Ohio Application October 28, 1940, Serial No. 363,193

7 Claims. (Cl. 16—180)

This invention relates in general to improvements in hinged connections and deals, more particularly, with devices of this character as employed to provide a hinged attachment of cooperating parts such as a receptacle body and its cover, formed of molded material, or in other applications wherein it is necessary or desirable to avoid the use of a conventional flap hinge, or the like, secured by screws, rivets, or other similar fastenings which are relatively expensive and otherwise objectionable because the same are unsightly in an assembly and involve excessive costs in requiring inordinate time in assembling operations and other steps of manufacture.

The invention is directed, further, to the provision of an improved hinged connection of this character embodying a simple, inexpensive fastening means which not only provides a hinged attachment of the cooperating parts but also, resiliently connects such parts under spring tension to effect an automatic snap action in the connection without the use of a separate spring element for this purpose.

In the construction of jewelry boxes and similar cases of molded plastic materials, the usual type of flap hinge connection is a relatively expensive arrangement and often involves considerable difficulty in securing the leaves of the hinge to the box parts in a simple, practicable manner without the use of externally visible screws, rivets, and similar securing devices.

The present invention has for a primary object the provision of a hinged attachment of cooperating, relatively movable parts, such as the body of a box or receptacle and a cover therefor, comprising a simple, inexpensive hinge fastening means designed for an improved method of hingedly attaching such parts without the use of externally visible securing devices or the external showing of such hinge fastening means.

A further object of the invention is to provide a hinge construction of this character which is strong and durable and the respective parts of which are especially adapted for easy and quick assembly in a minimum of time and effort. Another object of the invention is for the provision of such a hinged connection embodying a spring hinge fastening means providing a resiliency potential for resiliently urging and maintaining the cover in fully closed or open position or in partly open position under spring tension, and further, by a highly practical hinged relation of such parts without the use of cooperating bearing surfaces, such as special interfitting channel and bead formations, and the like.

Still another object of the invention is to provide an improved hinge fastening means of the kind described together with an efficient and inconspicuous arrangement for securing the same to the complementary parts of a box, or the like, formed of molded materials with portions thereof of such shape as to cooperate with such fastening means in providing a hinge construction which is strong, durable and easily and quickly assembled.

Further objects and advantages, and other new and useful features in the construction, arrangement and general combination of parts of the invention will be apparent to those skilled in the art as a description thereof proceeds with reference to the accompanying drawings, for purposes of illustration but not of limitation, in which like reference characters designate like parts throughout the same, and in which:

Fig. 1 is a vertical sectional view from front to rear of a receptacle embodying the improved spring hinge connection of the invention, the lid or cover being in partly open position;

Fig. 2 is a sectional view of Fig. 1 taken on line 2—2, looking in the direction of the arrows;

Fig. 3 is a sectional view similar to Fig. 1 with the lid in closed position;

Fig. 4 is a sectional view similar to Fig. 2, with the lid in closed position;

Fig. 5 is a sectional view similar to Figs. 1 and 3, with the lid in fully open position;

Fig. 6 is a plan view of the rear wall portion of the box body as taken on line 6—6 of Fig. 4 looking in the direction of the arrows;

Fig. 7 is a sectional view taken on line 7—7 of Fig. 5, looking in the direction of the arrows;

Fig. 8 is a perspective of a preferred form of hinge fastener shown employed in Figs. 1 to 7 inclusive;

Fig. 9 is a perspective of a modified form of hinge fastener;

Fig. 10 is a perspective of another modified form of hinge fastener;

Fig. 11 is a vertical sectional view from front to rear of a receptacle provided with another embodiment of the improved spring hinge connection of the invention, the lid or cover being shown in fully open position;

Fig. 12 is a transverse sectional view of Fig. 11 looking to the left in viewing the hinge connection in elevation;

Fig. 13 is a perspective of the hinge fastener shown employed in the embodiment of Figs. 11 and 12;

Fig. 14 is a plan view of the rear wall portion of the box body as taken on line 14—14 of Fig. 12, looking in the direction of the arrows;

Fig. 15 is a transverse sectional view through the box body, similar to Fig. 12, showing the hinge fastener as initially applied to the assembling opening in the rear wall thereof;

Fig. 16 is a fragmentary perspective of the rear wall portion of the box body showing the formation of the assembling opening therein in this embodiment of the invention;

Fig. 17 is a perspective of another form of spring hinge fastener employed in a further embodiment of the invention;

Fig. 18 is a transverse sectional view through a box body showing the hinge fastener of Fig. 17 as arranged in the assembling opening in the rear wall thereof preparatory to the attachment of the receptacle cover or lid thereto;

Fig. 19 is a top plan view of Fig. 18 showing the outline of the assembling opening in the rear wall portion of the box body;

Fig. 20 is a fragmentary sectional view showing in edge elevation the spring hinge fastener connecting the box body and cover in this form of the invention, the cover being in fully closed position; and Fig. 21 is a transverse sectional view of an assembled box body and cover in fully closed position and showing the fastener in front elevation in this embodiment of the spring hinge connection of the invention.

While the invention is disclosed with reference to receptacles in general, and especially in the nature of relatively small molded plastic jewelry boxes or cases, for example, it will be appreciated that the improved hinge construction is one of general utility and equally adaptable to various other similar and related uses in providing a spring hinge connection for cooperating parts in relatively movable relation in an assembly.

The box and cover therefor may be made of any selected material which is suitable for the purpose, such as wood, pulp, pressed metal, metal castings, etc. The invention is particularly advantageous with parts made by die-molding operations of plastic materials, or the like, which must be molded under conditions of high temperatures and pressures, with the dies of such a shape as to form the article and yet permit retraction of the dies after the molding operation. This limits to some extent the shapes which can be employed in making articles such as boxes, and the like, and one of the principal advantages of the invention resides in the fact the complementary parts of the receptacle may be readily molded at relatively low cost together with suitable, simply formed portions thereof adapted for the quick and easy assembly of the improved hinge fastening means therewith without the use of screws, rivets, or similar securing elements required in various flap hinge constructions.

Another advantage exists in the fact the assembling openings for the hinge fastening means are of a simple, compact nature and so designed to cooperate therewith that the resulting hinge connection is strong, durable, and capable of satisfactory and efficient service over a long period of use. Generally speaking, these results are obtained by providing one of the cooperating parts, such as the box cover, with means whereby a hook-shaped portion of a hinge fastener pivotally engages therewith while another portion thereof is slidably disposed in an assembling opening in the cooperating box body and resiliently retained by a spring element in abutting engagement with a shoulder or shoulders defined by such opening. The hinge fastener is preferably made of resilient material, such as spring metal, so that it can be readily snapped into assembled position and supply the resiliency potential for resiliently retaining the cover in fully closed or open position under continuously effective spring tension, and otherwise yield as necessary in the movement of the cover to various partly open positions without danger of distortion or crystallization which would cause a fracture or breaking thereof under constant usage or over a long period of service.

Referring now, more particularly, to the drawings, the invention is disclosed in connection with any two cooperating hingedly attached parts, designated generally A, B, which are capable of movement to various relative positions such as shown in Figs. 1, 3 and 5, for example. Said parts may be provided in any selected form or construction for any specific purpose or use, and in the present example, the same are shown assuming the form of a box body A and cover B cooperating therewith and which, if desired, may be reversed in position as for a watch case, for example, whereupon the part B would provide a shallow box base with the part A serving as a relatively deep cover therefor.

These cooperating parts may be constructed of any suitable material but inasmuch as the hinge construction is relatively simple and requires no extraneous fastening means, it will be appreciated that the invention is particularly advantageous and admirably suited for use in hingedly connecting parts formed of molded plastic materials such as "Bakelite," "Tenite" and numerous of other plastics having similar properties.

The body A of the box may be made in any selected size, shape or contour to include a bottom 1, front 2, sides 3, and a side or rear wall 4 to which the hinge is to be applied. Said wall 4 is provided with a vertically extending assembling opening which includes a recess 5 terminating approximately midway into a reduced size pocket 6 extending through to the upper edge of the box body and defining the spaced lateral shoulders 7 within the assembling opening. A channel-shaped passage 8 extends completely through the thickness of the box body facing the recess 5 and reduced size pocket 6. Spaced from the opposite face of said pocket 6 a distance approximating the thickness of sheet metal of which the hinge fastener is constructed, are guide fins 9 extending downwardly from the upper edge of the box body any suitable distance. These elements thus define an assembling opening of relatively simple formation and which is open at both ends and thus easily formed in a molded plastic part by the simplest type of molding dies which may be retracted in opposite directions through such open ends after the molding operation.

The cooperating part B forming the box cover in the present example, includes a complementary rear wall portion 12 provided with a transverse recessed area 13 of suitable size and shape to permit a pintle 14, or the like, to be secured in spaced relation to the adjacent surfaces thereof as seen in Figs. 1, 3 and 5. Preferably said pintle is arranged substantially in alignment with the central longitudinal area of the pocket 6 of the assembling opening in the box body in the assembled relation of the parts A, B, as shown in Fig. 3.

The pintle 14 may be provided in this manner in various suitable ways as by a simple U-shaped wire piece fixedly secured at its ends to the rear wall 12 of the cover B, as best seen in Fig. 7, the same being attached thereto in the manner of a metallic insert in the molding operation, or otherwise anchored in embedded relation therewith on being driven in a press fit into preformed holes in the plastic part. In this respect, said pintle may be defined by a simple, straight section of wire secured at its ends to bridge the recess 13 in a similar way, or otherwise provided in the manner of separate trunnions defined by spaced projecting wire pieces or integrally molded lug elements at either side of said recess.

The hinged connection of the cooperating box parts A, B, thus provided, is effected by a hinge fastener 20 of the character shown in Fig. 8 which is constructed of a section of any suitable sheet metal, preferably spring metal or of metal having spring like characteristics. A central body portion 21 of the fastener is of a width approximating the width of the pocket 6 of the assembling opening and includes lateral wings 22 adapted to be slidably received in the grooves defined by the guide fins 9 in said pocket 6. Extending from the lower edge of said body portion 21 is a bent web section or reduced neck 23 carrying a leaf spring element defining spring arms 24 extending generally at right angles to said fastener body 21 with the ends thereof projecting beyond the side edges of said body and capable of resilient spring action relative thereto.

A reduced portion extending from the upper edge of said body 21 is bent to define a head 25 extending in the same general direction as said leaf spring 24 and terminating in a substantial hook 26. Figs. 9 and 10 show modifications of the hinge fastener which may be similarly constructed but with portions thereof bent to form means for retaining a resilient wire piece providing spring arms 28 having a spring action and operation similar to the leaf spring arms 24 in the one-piece sheet metal hinge clip of Fig. 8, as presently to be described. Thus, in the fastener 20ª, Fig. 9, the reduced neck portion 23 extending from the body 21 of the fastener, is bent to form an eye element receiving a wire piece passed therethrough and defining the spring arms 28. An equivalent construction is shown provided by fastener 20ᵇ, Fig. 10, wherein a loop 29, or like element, is struck and formed from the sheet metal body 21 and retains a resilient wire piece passed therebetween and said fastener body to define the spring arms 28 projecting beyond the side edges forming the lateral wings 22.

The size and relation of the elements of the hinge fastener for the most effective operation and use thereof in providing a hinged connection of the cooperating parts A, B, will be understood from a description of the assembling operation which takes place by first applying the hinge fastener to the recess 5 in the assembling opening of the box body A with the head portion 25 of said fastener foremost. The body 21 is placed flush against the forward face of said recess 5 such that the lateral wings 22 are in line with the space or grooves defined by the guide fins 9. In this relation, the head portion 25, including hook 26, is designed to be received in the channel-shaped passage 8 and permitted to pass therethrough to extend above the top of the box body as shown in Fig. 5, whereupon the lateral wings 22 of the fastener body are slidably received in the grooves defined by the guide fins 9, as shown in Figs. 6 and 7, with the initial position of the hinge fastener being determined by the spring arms 24 thereof in abutting engagement with the shoulders 7 defined by the lower end of pocket 6, as shown in Fig. 4, for example. The head portion 25 of the fastener, including hook 26, is so spaced from the spring arms 24 as to extend above the box body in such initial position a distance slightly less than necessary to permit the hook 26 to be snapped over the pintle 14 fixed to the box cover or lid B in the fully open position thereof substantially as shown in Fig. 5.

Thus, in order to attach the hook 26 to the pintle 14, it is necessary to pull the hinge fastener upwardly against the tension of the spring arms 24, in abutting engagement with shoulders 7, to a point in which said hook 26 may clear and snap onto said pintle 14. In this position, said spring arms 24 are disposed in a slightly flexed condition to supply the desired snap action maintaining the box cover in fully open position, Fig. 5, or fully closed position, as shown in Figs. 3 and 4. Preferably, the box cover or lid B is hingedly connected to the box body A by disposing said lid in fully open position, substantially as shown in Fig. 5, whereupon the hook 26 of the hinge fastener may be easily and quickly snapped on the pintle 14 by a simple force necessary to raise the hook 26 sufficiently for this purpose, at the same time moving the box cover such that said pintle 14 thereon may be embraced by said hook 26 of the fastener.

This completes the hinged connection of the box parts A, B, with the cover or lid B in fully open position, as shown in Fig. 5, and with the spring arms 24 in a flexed condition somewhat less than shown in Fig. 2 wherein said cover is disposed partly open at an angle of approximately forty-five degrees to the box body. In moving the box cover B from the fully open position of Fig. 5 to that of Fig. 1, for example, the spring arms 24 move from their initial slightly flexed condition to a state of pronounced flexion as illustrated in Fig. 2. This action takes place incident to an upward sliding movement of the fastener body 21 as the pintle 14 simultaneously pivots and pulls the hook 26 upwardly to its more or less end up upper movement due to the necessary change of position of said pintle 14 as the corner 15 of the box cover B slides on the top of the box body from the position of Fig. 5 to that of Fig. 1. Further movement of the box cover or lid B to the closed position illustrated in Figs. 3 and 4, results in lowering of the pintle 14 and hook 26 pivotally connected thereto under tension of spring arms 24 which assume a slightly flexed condition as illustrated in Fig. 4 to supply the necessary resiliency potential for resiliently retaining the cover in fully closed position in one limit of relative movement of the hingedly connected parts, with the amount of flexion of the spring arms 24, as shown in Fig. 4, being more or less the same for resiliently retaining the cover in fully open position in the other limit of movement thereof.

This hinged connection of the cooperating parts A, B, thus operates substantially in the manner of a floating pivot capable of any movement necessary to compensate for the relative movement of the hingedly connected parts. The hinge action of the fastener otherwise is in the nature of a combined pivot, provided by hook 26, and simultaneously operating sliding action of the fastener body 21 in the grooves defined by the guide fins 9, amounting to what may be termed, a reciprocating slide or shuttle action allowing the pintle 14 to move to various positions in the relative movement of the hingedly connected parts A, B. At the same time, this action takes place under continuously effective spring tension supplied by the spring arms 24 which yield as necessary in the relative movement of the hingedly connected parts A, B, and otherwise provide the necessary spring force supplying the desired snap action of the cover or lid B when approaching the fully closed position of Fig. 3 or the fully open position of Fig. 5.

Between such limits of relative movement of the cooperating parts to any partly open position of the cover B, it will be understood that in the foregoing described pivotal engagement of the pintle 14 and hook 26 of the fastener, the body 21 of the fastener is forced to move vertically in the same plane at all times by reason of the sliding action of the lateral wings 22 thereof in the grooves defined by the guide fins 9. Thus, the hingedly connected parts are maintained against objectionable lateral shifting or displacement with respect to each other to provide a strong and durable hinged connection in which there is little possibility of disassociation of the hook 26 and pintle 14 or other improper operation of the hinged connection. At the same time, the fastener body 21 is disposed in surface engagement with the forward face of pocket 6 such that sliding action thereof is even and uniform at all times.

An important advantage of the present invention resides in the fact that the box cover or lid is self-sustaining in various partly open positions before the desired snap action supplied by the spring arms 24 becomes effective to resiliently urge and maintain the box cover in fully open or closed position, as the case may be. It will be understood that in movement of the box cover or lid B to any partly open position such as shown in Fig. 1, for example, the corner or heel 15 has resilient sliding contact with the adjacent top surface of the box body under tension of the spring arms 24. However, this spring force normally is not sufficient to overcome the frictional surface engagement of the fastener body 21 with forward face of the pocket 6, wherefore the box cover can easily be arranged in various partly open positions between the limits approaching the fully open or fully closed position thereof as necessary or desirable for certain display purposes. No separate supporting means is required for holding the cover in any such partly open position and the same will remain as fixed unless and until an added force is supplied by the user to move the parts to a position in which the cover B approaches either the fully open or fully closed position thereof, whereupon the desired snap action supplied by the spring arms 24 of the fastener takes place, as aforesaid, to resiliently urge and maintain the box parts in fully open or fully closed position, as the case may be.

Figs. 11 to 16 inclusive are directed to another embodiment of the invention which is substantially similar in operation and use to the spring hinge connection described with reference to Figs. 1 to 8 inclusive, but includes a somewhat simplified assembling opening in the box body A' designed for use with a hinge fastener of the type shown in Fig. 13. The assembling opening is provided in substantially the form illustrated in Fig. 16 in a manner whereby the same need not extend entirely through the rear wall of the box body A' and define a hole in the base thereof which might be objectionable in some instances. However, if necessary to facilitate molding of the box body, the assembling opening in this embodiment of the invention may also be formed by a passage extending entirely through the rear wall 4 of the box body, as in Figs. 1 to 7 inclusive, so long as the lower recess 35 thereof merges into reduced size open pocket 36 to provide lower spaced shoulders 37, and upper guide lugs 39 or similar elements spaced from the adjacent rear wall 38 of said pocket, thereby defining grooves for slidably receiving the lateral wings 22 on the body of the hinge fastener 20°, Fig. 13.

Said hinge fastener is substantially similar in construction to that of Fig. 8 except that the leaf spring element providing the spring arms 31 is bent in an opposite direction to the head portion 25 with said lateral wings 22 thereof not quite so long. The fastener is thus designed to be received in the assembling opening in the rear wall of the box body A' substantially as illustrated in Fig. 15, with the body 21 thereof disposed in pocket 36 in sliding engagement with the adjacent rear face 38 of said pocket as shown in Fig. 14, in line with the grooves defined by the guide lugs 39.

The fastener is then slid upwardly to substantially the position of Fig. 12 to flex the spring arms 31 in abutting engagement with shoulders 37 and dispose the lateral wings 22 thereof in interlocked relation in the grooves defined by the guide lugs 39. In this position, the head portion 25 of the fastener including hook 26, projects sufficiently above the top of the box body A' to permit said hook to be snapped onto the pintle 14 attached to the rear wall 12 of the cover or lid B' in fully open position, as shown in Figs. 11 and 12, to provide a completed hinged connection which is designed for operation and use in substantially the manner described with reference to Figs. 1 to 8 inclusive.

Figs. 17 to 21 inclusive disclose a further embodiment of the invention in which the assembling opening is similar to that of Fig. 16 but capable of further simplification in using a two-piece hinge fastener 20$^d$ such as shown in Fig. 17. The fastener body 21 is more or less equivalent in structure to those previously described except that a resilient wire piece provides the spring arms 41 thereof, as represented by dotted lines in Fig. 17, on being received in a lower hook 42 formed from the reduced neck portion 23 depending from said fastener body. The vertically extending assembling opening is of a type which need not extend entirely through the rear wall 4 of the box body A'' thereby avoiding any external showing thereof, but if necessary to facilitate the molding operation, the same may be provided in the manner of Figs. 1 to 7 inclusive by a passage extending entirely through such rear wall. In either case, the assembling opening includes a lower recess formation 45 merging into a reduced size pocket 46 defining shoulders 47 adjacent guide ribs 49, or the like, which are spaced from the adjacent rear face of said pocket to define grooves for receiving the lateral wings 22 on the fastener body.

A guide slot is thus presented in the box body A'', as seen in Fig. 19, whereupon the fastener may be inserted in the assembling opening from the top of the box body with the lower hook 42 foremost and extending forward in the space between the guide ribs 49, while the lateral wings 22 on the fastener body are received in the grooves defined by said guide ribs 49, as aforesaid. The fastener is thus disposed in the assembling opening to a point at which the lower hook 42 extends into the recess 45, whereupon the wire piece providing spring arms 41, is then applied through said recess 45 and received in said hook 42. The fastener is then slid upwardly to flex the spring arms 41 against the shoulders 47 at the lower end of pocket 46, substantially as shown in Fig. 18, and in this position, the head portion 25 of the fastener including the hook 26 extends sufficiently above the top of the box body A" to permit said hook to be snapped onto the pintle 14 attached to the cover or lid B" in the fully open position thereof, thereby completing the assembly for operation and use in a manner similar to that described with respect to the embodiment of Figs. 1 to 8 inclusive. When the lid is closed the assembly appears substantially as shown in Figs. 20 and 21, with the spring arms 41 under a lesser degree of flexion than that of Fig. 18 but having a suitable resiliency potential for resiliently urging and maintaining the cover in fully closed position and capable of yielding as necessary to permit the cover to be pivoted to any partly open position approaching the fully open position thereof, whereupon said spring arms 41 are effective to urge the cover to such fully open position in an effective substantial snap action, as aforesaid.

An important advantage of the invention resides in the fact that, in any embodiment, the cooperating box parts may be provided of relatively simple formation, especially in the area of the cooperating hingedly connected portions thereof, and without special pivotal bearing surfaces such as interfitting channel and bead formations, for example. This, of course, makes possible the use of inexpensive molding equipment and a comparatively simple molding operation especially suited for large scale, mass production, while any form of the spring hinge fastener may be produced at comparatively low cost and easily and quickly applied in a simple assembling operation to provide an effective and reliable hinged connection wherein the costs of manufacture are reduced to a minimum.

While generally, parts hingedly attached in accordance with the invention require only a single hinged connection due to the inherent strength, durability and reliability of the spring metal hinge fastening device employed, certain assemblies embodying relatively large parts are advantageously designed for use with a plurality of such connections provided in substantially the same manner for cooperative operation and use, as may be readily understood.

And while the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener for hingedly connecting cooperating relatively movable parts, said fastener comprising a unitary metallic device having a substantial hook for providing a pivotal relation with a pivot on one of said parts, a body receivable in an opening in the other of said parts, and a spring arm element attached to said fastener body and means in said opening cooperating with said spring arm element to secure the fastener body in said opening and resiliently retain the same in movable relation in said opening.

2. A fastener for hingedly connecting cooperating relatively movable parts, said fastener comprising a unitary metallic device having a substantial hook for providing a pivotal relation with a pivot on one of said parts, a body receivable in an opening provided with guide means and a shoulder in the other of said parts, means defined by said fastener body adapted for slidable relation with said guide means, and a spring arm element attached to said fastener body and adapted to engage said shoulder to secure said fastener body in said opening and resiliently retain the same in slidable relation in said opening.

3. A fastener for hingedly connecting cooperating relatively movable parts, said fastener comprising a device having a substantial hook element for providing a pivotal relation with a pivot on one of said parts, a body receivable in an opening defining a guide groove and a shoulder portion in the other of said parts, a section of said fastener body adapted for slidable relation in said guide groove, and a spring arm attached to said fastener body and adapted to engage said shoulder portion to secure said fastener body in said opening and resiliently retain the same in slidable relation in said opening.

4. A fastener for hingedly connecting cooperating relatively movable parts, said fastener comprising a device having a substantial hook element for providing a pivotal relation with a pivot on one of said parts, a body receivable in an opening defining spaced guide grooves and a shoulder portion in the other of said parts, said fastener body including sections adapted for slidable relation in said guide grooves, and a spring arm element attached to said fastener body adapted to engage said shoulder portion to secure the same in said opening and resiliently retain said fastener body in slidable relation in said opening.

5. A hinge device comprising a sheet metal body having a hook adjacent one end defining pintle engaging means, a guide portion on said body, and a spring arm connected to said body extending generally parallel to the axis of the pintle engaging means defined by said hook.

6. A hinge device comprising a sheet metal body having a hook adjacent one end defining pintle engaging means, a guide portion on said body, and a leaf spring connected to said body extending generally parallel to the axis of the pintle engaging means defined by said hook.

7. A hinge device comprising a sheet metal body having a hook adjacent one end defining pintle engaging means, lateral guide portions on said body, and a leaf spring connected to said body providing spring arms having oppositely disposed free ends and extending generally parallel to the axis of the pintle engaging means defined by said hook.

ALBERT H. TINNERMAN.